Oct. 10, 1961 R. B. BASSETT ET AL 3,003,220
CERAMIC PRODUCT AND PROCESS FOR MAKING SAME
Filed Feb. 9, 1959 3 Sheets-Sheet 1
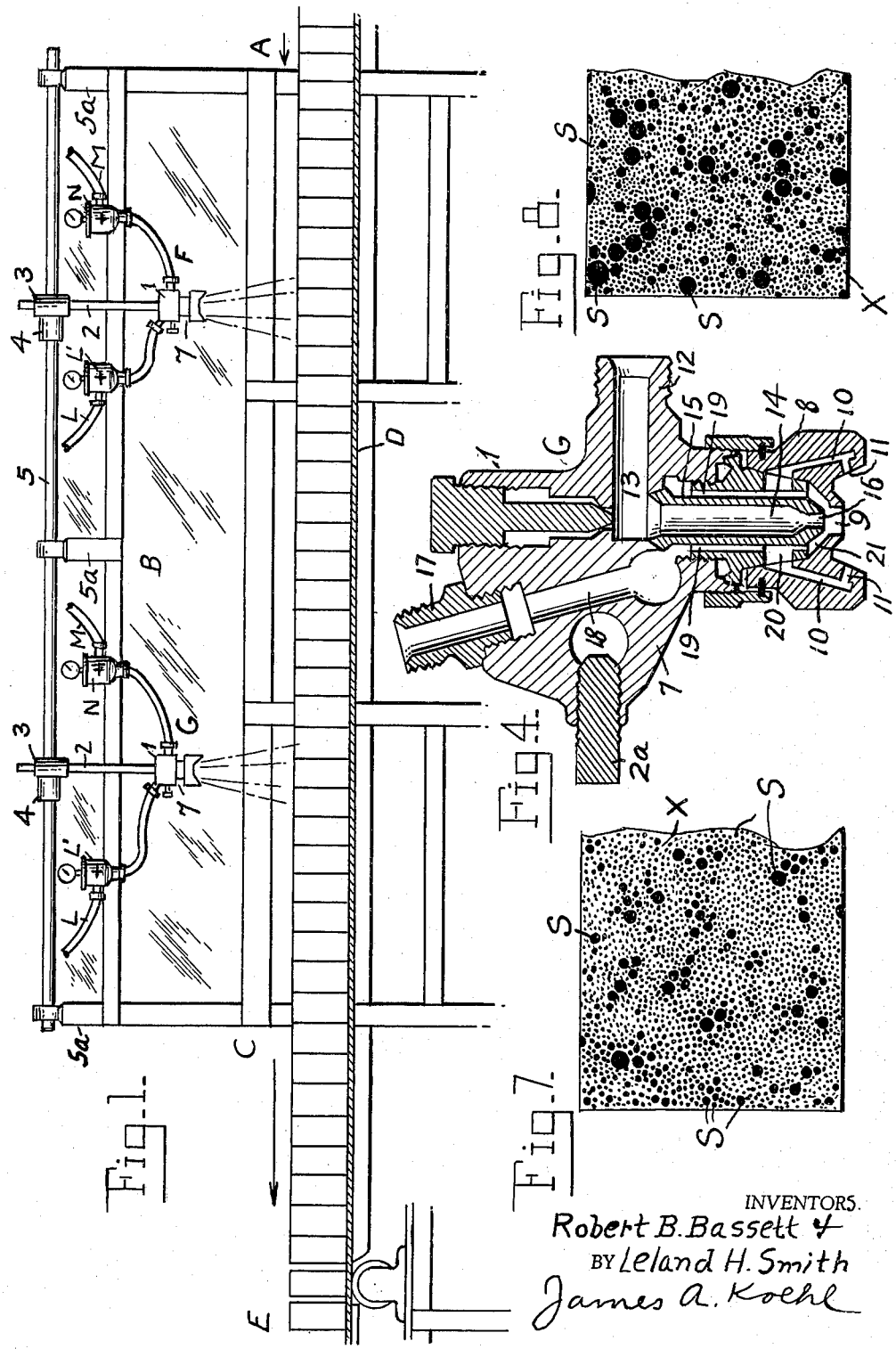
INVENTORS.
Robert B. Bassett &
BY Leland H. Smith
James A. Koehl

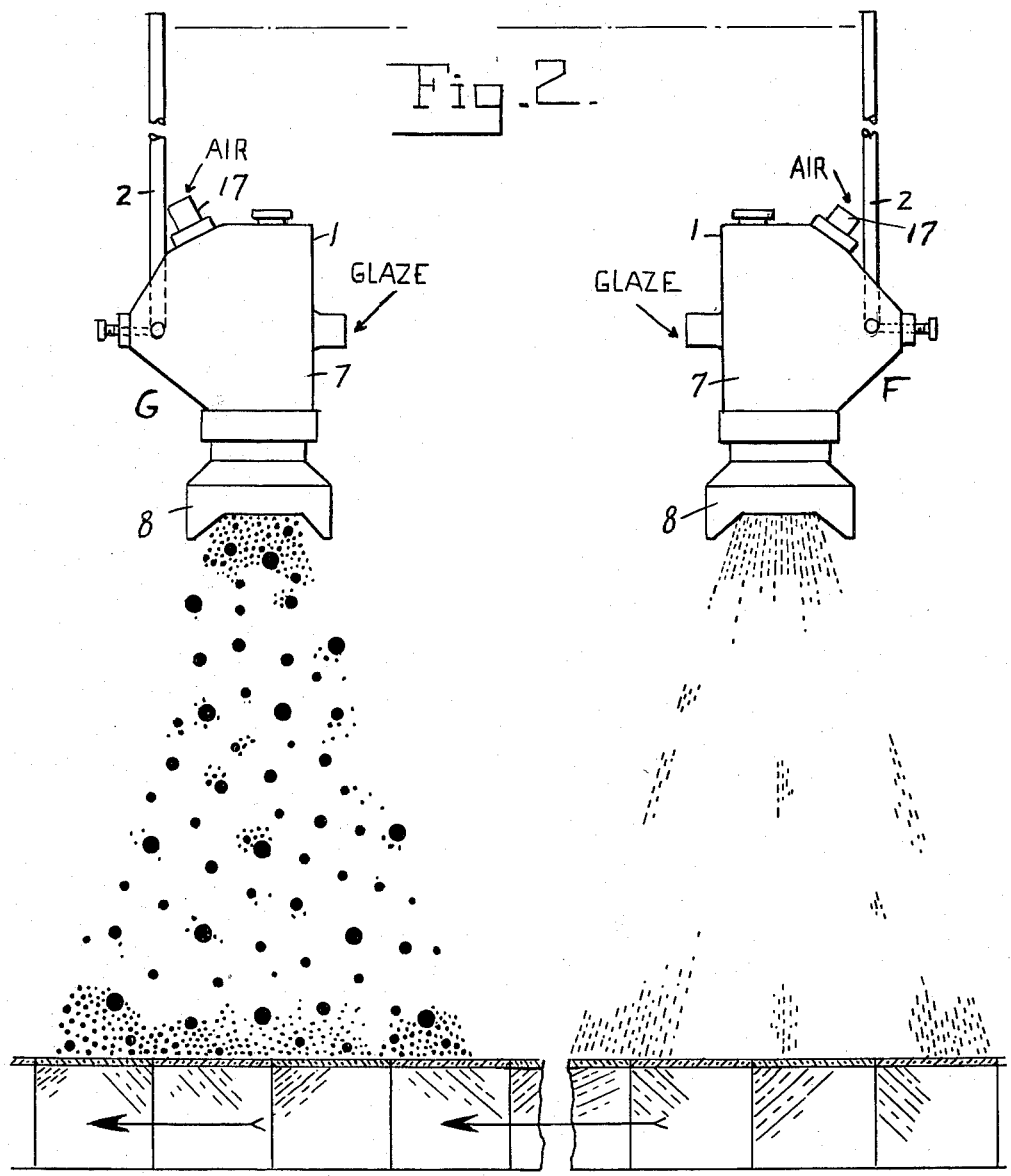

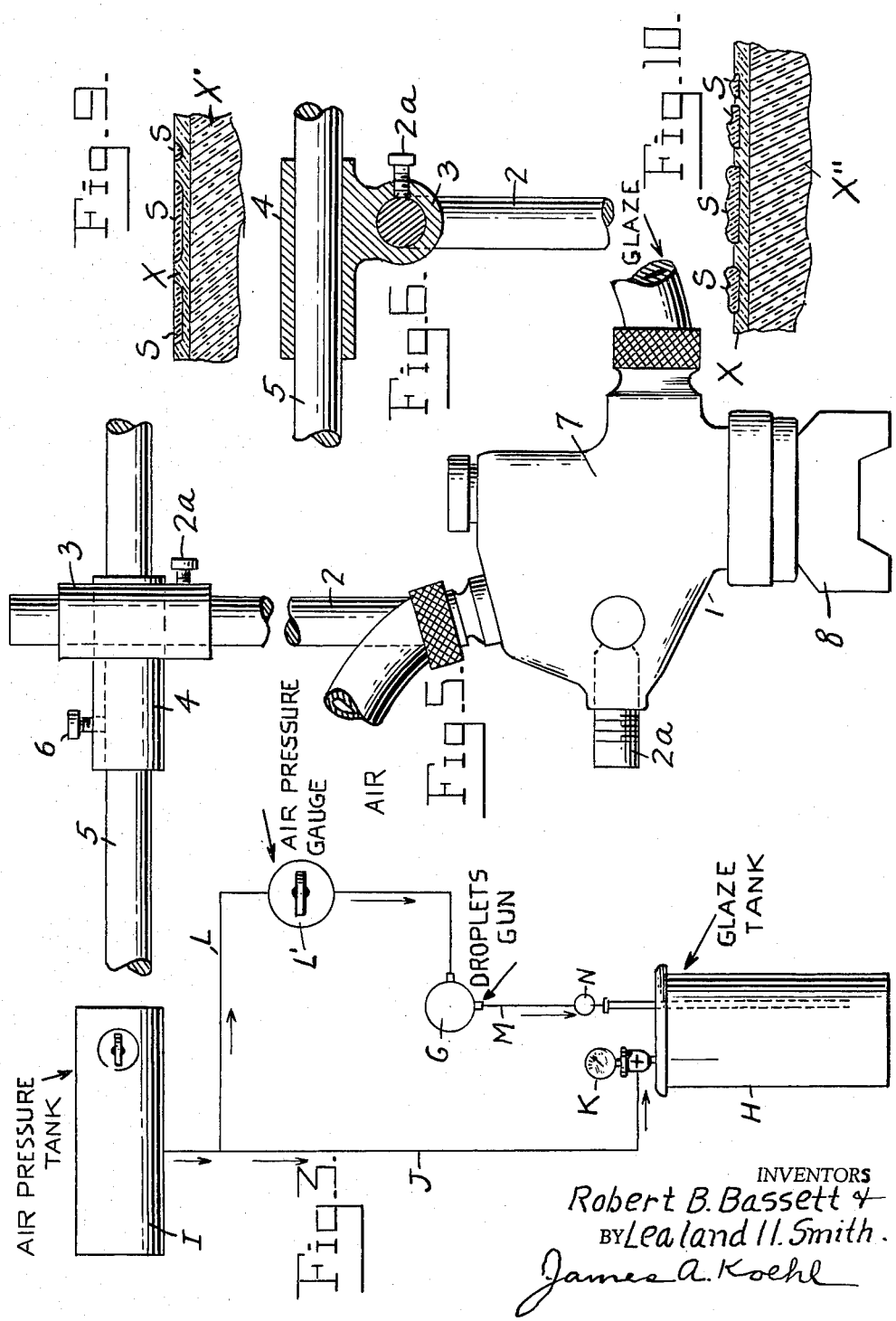

United States Patent Office 3,003,220
Patented Oct. 10, 1961

3,003,220
CERAMIC PRODUCT AND PROCESS FOR MAKING SAME
Robert B. Bassett and Leland H. Smith, Darlington, Pa., assignors to Central Commercial Company, Chicago, Ill., a corporation of Illinois
Filed Feb. 9, 1959, Ser. No. 791,969
2 Claims. (Cl. 25—156)

This invention relates to the manufacture of ceramic products generally and more particularly to a continuous process for the surface coating and ornamentation of prepared hydrous plastic clay which has been forced through the die of an automatic brick machine and formed into a rectangular bar which is cut into lengths of the brick and successively discharged from the machine, which said process consists in applying ceramic coating and spotting glaze compositions to at least one surface of said cut lengths in synchronism with the speed at which they are conducted from the machine, following which, said lengths are dried and then fired to mature the clay, convert the coating composition into a heterogeneous glassy matrix which is weather resistant, insoluble in water, acids and alkalies and is exceedingly tough and durable and permanently bonded to the surface of the product of the process, and to cause chemical and physical changes to take place to convert solids contained in the spotting composition into a liquid leaving suspended particles in liquidus with resultant production of ornamental glassy spots upon the surface of said coating.

The gist of the invention finds expression in applying to surface of brick or other ceramic products a base coat consisting of a selected glaze composition of and desired color and successively therewith applying to the surface of the applied coating a spotting glaze composition and controlling at will and with great nicety the velocity and amount thereof distributed to said surface, these procedures enabling producing on brick or other articles of merchandise a wide choice of decorative motifs in many different color combinations.

The substances comprising the herein disclosed base coating and spotting glaze compositions are in proportions to form a "batch" or glaze mix which is ground wet to provide a flowable glaze slip. We have discovered that by controlling the amount of air pressure and the amount of spotting glaze admitted to a spray gun, the glaze will discharge from the gun in the form of discrete spherical droplets of assorted sizes and magnitudes ranging from those that predominate and are diminutive to others that are large relative thereto and themselves comprise droplets in which the smaller predominate the larger ones. It follows that by the force of impact of the droplets against a wet freshly applied base coating, said droplets slightly penetrate the surface of said coating and assume or take the form of circular spots of vitrifiable substances, the extent of the penetration being proportional to the magnitude of the individual droplets.

The herein disclosed invention is an improvement in heretofore known processes for speckling glaze coatings with expensive discrete particles of selected metals that are fused at elevated temperatures, in which processes, said metallic particles are blown or sprinkled upon the surface of the object being ornamented.

Therefore, in a general sense, the herein disclosed invention is embrasive of each and all of the above enumerated new, novel and distinguishing features together with other objects and advantages which will appear apparent to persons skilled in the art upon reference to the following description taken in connection with the accompanying drawings wherein:

FIGURE 1 is a schematic longitudinal sectional view of the spray booth interposed between the discharge end of an automatic brick machine and a transfer mechanism upon which latter the brick are received, then conducted to a point where they are inspected preparatory to drying and firing same;

FIGURE 2 is a view similar to FIGURE 1 showing in greater detail the decidedly marked difference between the discharge sprays from the respective guns;

FIGURE 3 is a schematic view of the spotting gun connected in a system comprising an air compressor and a liquid supply source;

FIGURE 4 is a vertical section through the spray gun for the spotting glaze;

FIGURE 5 is a view in elevation with parts in section showing the manner of supporting the respective spray guns;

FIGURE 6 is a view partly in section and partly in elevation showing the means enabling longitudinal and angular adjustment of the spray guns from the rotational shaft;

FIGURES 7 and 8 are views in elevation of different examples of the end product of the process, and FIGURES 9 and 10 are sectional views showing alternative types of spotting substances on end products of the process.

*The glaze compositions*

While many different well known glaze compositions can be employed, excellent results are had with a glaze consisting of a flowable liquid of selected particle sizes of plastic and non-plastic inorganic non-metallic materials which have been suspended in an aqueous media by mechanical and chemical means. The plastic and non-plastic inorganic and non-metallic materials are classified as $RO$, $R_2O_3$ and $RO_2$ groups chemically and are of the following empirical molecular relationships:

| $RO$ | $R_2O_3$ | $RO_2$ |
|---|---|---|
| 1.0 | .423 to .312 | 3.283 to 1.685 |

The $RO$ group consists of oxides of all or part of such substances as sodium, calcium, barium, zinc, magnesium and similar oxides ordinarily employed in glazes.

The viscosity of said flowable liquid measured at standard conditions ranges between 2,000 and 14,000 centipoises measured by a spindle-plate type viscometer.

The base coat liquid and the speckling liquid may be of the same composition and the same viscosity, the difference being that an opacifying agent is added to the base coat liquid and that said liquid may or may not be pigmented, whereas, the speckling liquid has no opacifying agent but ordinarily is pigmented. However, when in some instances this order will be reversed as to the pigment content of the respective liquids.

A preferred example of a satisfactory flowable liquid is shown empirically as follows:

| $RO$ | $R_2O_3$ | $RO_2$ |
|---|---|---|
| 1.0 | .312 | 1.685 | with the $RO$ group consisting of oxide of potassium, sodium, calcium, barium, zinc and magnesium, the $R_2O_3$ substance consisting of oxide of aluminum and the $RO_2$ substance consisting of oxide of silicon. As above stated, the glazes may be of any one of many formulations commonly employed in the art, it being understood that the materials used in compounding glaze batches are classified as follows:

(1) *Bases.*—These are fluxing agents represented by the RO or $R_2O_3$ groups given in the above empirical molecular formula, the same including the alkalies, the alkaline earths and similar oxides.

(2) *Intermediates.*—The amphoteric oxides, the $R_2O_3$ classification comprising alumina, ferric, chromic and other similar oxides.

(3) *The acids.*—The $RO_2$ (silica) content and its relation to the RO (fluxing agents) serving to regulate the degree of fluidity of the molten glaze, giving thereto the stability needed at elevated temperatures for maturity.

As an example of formulations and the substances and proportions used according as it is desired to decrease or increase the refractoriness of the glaze, the following may be satisfactorily employed:

|  | Formula 1, Percent | Formula 2, Percent | Formula 3, Percent |
|---|---|---|---|
| Feldspar | 56.2 | 56.2 | 56.2 |
| Whiting | 9.4 | 9.4 | 9.4 |
| Zinc Oxide | 6.6 | 6.6 | 6.6 |
| Clay | 13.3 | 11.3 | 17.3 |
| Flint | 14.5 | 16.5 | 10.5 |

|  | Formula 4, Percent | Formula 5, Percent | Formula 6, Percent |
|---|---|---|---|
| Feldspar | 40.0 | 40.0 | 40.0 |
| Whiting | 10.0 | 10.0 | 10.0 |
| Barium Carbonate | 5.0 | 5.0 | 5.0 |
| Zinc Oxide | 4.0 | 4.0 | 4.0 |
| Zirconium Silicate | 10.0 | 13.0 | 10.0 |
| Flint | 23.0 | 20.0 | 26.0 |
| Talc (Tremolitic) | 8.0 | 8.0 | 5.0 |

Any of the bases, intermediates and acids commonly employed in glazes can of course be used and reference herein to the above classification of substances shall not be construed as a limitation.

*The coloring substances*

| The Color Range | The Substances |
|---|---|
| green | cobalt chrome oxides. |
| Do | chrome oxide. |
| Do | chrome, calcium oxide. |
| yellow green | cobalt, chrome, vanadium oxides. |
| Do | cobalt, vanadium oxides. |
| chartreuse | cobalt, tin, vanadium oxides. |
| Do | copper, vanadium oxides. |
| turquoise | copper, zirconium oxides. |
| Do | cobalt, zirconium, vanadium oxides. |
| Do | zirconium, vanadium oxides. |
| blue | cobalt, zinc silicates. |
| Do | cobalt silicate. |
| Do | cobalt, aluminum oxides. |
| purple | cobalt, chrome, tin oxides. |
| maroon | chrome, tin oxides. |
| pink | chrome, tin, manganese oxides. |
| Do | chrome, aluminum oxides. |
| brown | chrome, zinc, iron oxides. |
| tan | chrome, zinc, iron, zirconium oxides. |
| yellow | tin, vanadium oxides. |
| Do | zirconium, vanadium oxides. |
| gray | manganese, iron oxides. |
| Do | cobalt, iron oxides. |
| Do | tin, antimony oxides. |
| black | chrome, iron oxides. |
| Do | cobalt, iron oxides. |
| white | titanium dioxide. |
| Do | zirconium silicate. |

Any of the above inorganic pigments can be used either as a speckling substance or as a pigment in the base or ground coat.

Having set forth the various glaze formulations and fusible glass forming spotting substances that can be satisfactorily employed in carrying out our invention, the herein exemplified form of the invention comprises coordinated and interrelated mechanisms adapted to provide a continuous process for manufacturing a wide variety or range of glaze coated and ornamental ceramic products of unusual beauty and attractiveness. In the instant disclosure an automatic brick making machine is an instrumentality providing a first step in the glaze coating and ornamentation of brick, tile and other structural ceramic products. Such machine functions to form and cut prepared hydrous plastic clay into predetermined lengths and shapes and successively conduct same to a conveyor, thence through a spray booth at a speed sensibly in synchronism with continuous egress thereof from the machine. In like manner, the coated and decorated lengths are then discharged from the booth, dried and then fired.

While emphasis is placed upon the manufacture of brick, tile and other structural products, products such as wall and building panels, objects of art, table tops, etc. may be similarly produced.

It is recognized that clays that are naturally dark or burn dark on firing require an excess of expensive opacifying material as a hiding medium. An important feature of our invention is the production of ornamental glaze coated products, the base coatings on which can comprise one or any combination of lighter and brighter colors than heretofore possible. Accordingly, a preferred clay which we use is one that is either white or buff burning or a blend of suitable clays as distinguished from commonly used clays containing large amounts of iron.

Referring now to FIGURE 1 of the accompanying drawings, A denotes the point of ingress of preformed objects of prepared hydrous plastic clay to a spray boot B. C denotes the point of egress of the coated and ornamented objects from the booth. An endless conveyor D connects points A and C and conducts the coated objects to a take-off point E where they may be inspected, then placed on pallets for drying or run through drying tunnels in the well known manner preparatory to firing to mature the clay and convert the coating and spotting substances to a glassy state.

F is a spray organization for applying the base coating glaze to the objects and G is a somewhat similar organization for controlled deposition of spherical droplets of varying sizes of a selected spotting glaze composition upon the base coating. These organizations are structurally similar but functionally dissimilar. It suffices to say that each thereof comprises a downwardly directed gun 1 which is vertically adjustable on a hanger or supporting rod 2, the latter passing through a lateral tubular extension of a horizontally disposed sleeve 4. A longitudinally extending and horizontally disposed shaft 5 is mounted to respectively turn clockwise and counter clockwise in bearing brackets 5a. Said sleeves 4 are mounted on said shaft for longitudinal adjustment enabling spacing the respective guns a necessary distance apart from each other and turned to desired positions of angular adjustment, then rigidly secured to said shaft by set screws 6. As shown, rods 2 are adapted to be held in selected positions of vertical adjustment in said extensions 3 by set screws 2a. Thus, each organization is adapted to be individually raised and lowered to respective elevations relative to the plane of travel of the objects under treatment. Shaft 5 may be turned either by hand and held in a fixed condition of adjustment by any well known means, or the shaft may be operated by any well known mechanism.

Gun G essentially comprises a structure 7, the nozzle 8 of which has an axial liquid discharge orifice 9 and liquid discharge orifices 10—10 each terminating in an effective downwardly directed orifice 11 disposed at an acute angle to the axis of orifice 9. A liquid feed connection 12 has a lateral orifice 13 whose inner end opens to the central bore 14 of a member 15 attached to the lower end of said body 7, and as illustrated, said bore terminates in a restricted orifice 16 which is coaxial to said orifice 9.

At 17 is a connection adapted to supply air from a compressor to a bore 18 in said body 7, said bore communicating with ducts 19 in member 15 and with passage ways 20 in said member and with angular passage ways 21, the latter opening to orifice 9. These are the essential structural features of the spotting gun G and, as will be presently pointed to, they mutually function to allow both the amount of compressed air and the spotting liquid to be controlled with resultant deposition upon the surface of the object under treatment of spherical droplets of glaze, which glaze, with the omission of an opacifying agent may be like the glaze providing the base coat on said object from gun F. To this point in this description of the herein disclosed invention, it is manifest that glaze of any desired color can be employed and that the spotting glaze may comprise any one of a large choice of fusible and vitrifiable substances for producing spots of most any color on said base coating.

Referring to FIGURE 3 which schematically illustrates the connection of gun G with a source of compressed air and a glaze supply source, G denotes the gun, H a glaze supply tank, I an air pressure tank, J a line between tank I and an air pressure gauge K on tank H, and L the air supply line between the gun, M representing the glaze feed line between the gun and said tank H. Line M has therein a pressure gauge N for controlling the amount of glaze admitted to said gun. Thus, the effectiveness of gun G, i.e. setting thereof is regulatable at will, whereby the ratio of the larger droplets to the smaller droplets can be controlled according to a desired result in the processing of an object.

FIGURE 2 shows, as clearly as possible the difference between the characteristics of the liquids discharging from the respective spray guns. Here, it is observed that the liquid discharging from gun F takes the form of a fine spray or mist, whereas, the liquid discharging from gun G has the form of well defined spherical droplets of the stated different sizes.

Referring again to FIGURES 7 and 8 of the drawings, it is noted that the circular spots S on the base coat upon the specimen in FIGURE 8 are more dense than are the spots on specimen, FIGURE 7 and that the ratio of the larger spots to the smaller spots on specimen 8 is greater than in the case of specimen 7. There seemingly is no limitation upon the possible number of changes in pattern effects than can be produced by selected control of both the pressure of the compressed air admitted to gun G and the amount of spotting liquid supplied said gun. It follows, as it must, that the pressure of air and the amount of spotting liquid can be set so that spotting can be controlled with great nicety to any person skilled in the art.

At FIGURE 9 the base coat X on specimen X', upon firing, will have set or embedded therein spots S that lie flush with the surface of the base coat, whereas, the circular spots S on the base coat X" are only partly embedded in said base coat, the upper surfaces being disposed slightly above the surface of the base coat and present a more glassy appearance than the spots on specimen X', also that their upper surfaces are more or less irregular. Any of these surface effects can be produced according as different spotting substances are used as provided for herein.

Having set forth the modus operandi, i.e. the various steps employed in coating and spotting the product of the herein disclosed process it remains merely to say that upon completion of the drying step, the product is fired to mature the clay and fuse the base coating and the spots to a glassy state. This is accomplished by firing the product in a continuous tunnel kiln operating on a 55 to 60 hour cycle at a temperature of about 2050° F. in an oxidizing atmosphere. In this firing of the product chemical and physical changes take place changing the solids to a liquid leaving suspended particles in liquidus. These changes are brought about by heat, and glass of varying types are formed. Being basically of like composition the same changes take place in both the spotting glaze and the base coat glaze. The spotting liquid has no special affinity for the base glaze coat as they are of the same composition and have the same physical characteristics and join readily without discontinuity of the interfaces. The resulting surface of the finished product is a heterogeneous, tough and well bonded glassy matrix which is completely weather resistant, insoluble in water, acids and alkalies. We place considerable stress upon the fact that with the herein disclosed techniques, variations may be made at will and are controllable and that a very large range of blending and shadings are obtainable.

We have stated certain advantages attending continuously coating and spotting brick or other products in the timed order of their discharge from a machine that forms the product. We do not wish to be limited in this respect as we consider it within the spirit of the invention to depart therefrom, for example, instead of first coating and spotting the product, then drying and firing same, the product may be coated and spotted after it has been dried, the end result remaining the same.

At FIGURE 1, L, L', N and M denote the lines and the pressure gauges between the source of compressed air and the liquid supply source and the gun organization G. As like instrumentalities are embodied in the gun G organization, like reference characters are used to denote same.

Regarding the longitudinal distance apart from each other of gun organizations F and G, the distance is not more critical than is the necessity for controlling drying the base coat during translation of the product through the spray booth. The greater the distance between the organizations, less is the possibility of intermingling of the two glazes. Good results are had by proper adjustment of the viscosity of the glaze to prevent flowing and mingling. It suffices to say that the distance shall be such as to retain the base coat in a condition enabling slight penetration thereof by the droplets. This, taken with control of the viscosity insures good definition of the circular spots.

The distance between the spray nozzles and the brick is generally about 18 inches, the type of nozzle being largely a determining factor as will be appreciated by persons trained in the art. It is sufficient to say that it must be positioned so as to thoroughly cover the surface of the object throughout the entire area under treatment. The angle of the gun to the brick is about 90°.

The linear speed of the brick through the spray booth is about 38 feet per minute plus or minus 10 percent. This speed is held sensibly constant with the operating speed of the brick machine, it being understood that the speed variation will be necessarily altered according as there shall be a given thickness of the base glaze to be applied to the object, the ratio between it and the spotting glaze remaining constant.

What we claim is:

1. The continuous method of manufacturing glazed building bricks, comprising, conveying a column of successively and continguously related building bricks at a predetermined unidirectional linear speed, directing against like surfaces of the bricks by superatmospheric pressure a steady mist of a colored viscous coating glaze to form on said surfaces a coating of desired thickness of said glaze, impinging against the surface of the applied coating by superatmospheric pressure and while the coating is wet, discrete droplets of different sizes of a steady stream of droplets of a viscous ceramic spotting glaze of substantially the same composition as, but differing in color from the coating glaze to flatten the droplets into spots of substanially circular shape and slightly embed same in the body of the applied coating with the upper surfaces of the spots substantially in the plane of the surface of the coating, predetermining the amount of the spotting glaze to produce said droplets, and heat treating the bricks to form the glazes into similar heterogeneous glassy matrices permanently bonded to said like surfaces of the bricks.

2. The method as set forth in claim 1 in which the viscosity range of the respective glaze is from 2,000–14,000 centipoises.

References Cited in the file of this patent

UNITED STATES PATENTS

| | | |
|---|---|---|
| 2,191,106 | Denison et al. | Feb. 20, 1940 |
| 2,511,627 | Einbecker | June 13, 1950 |
| 2,627,101 | Le Clercq | Feb. 3, 1953 |